United States Patent [19]

Dirkx et al.

[11] Patent Number: 6,002,231

[45] Date of Patent: Dec. 14, 1999

[54] CONTROL BY MEANS OF A SET-POINT GENERATOR

[75] Inventors: Walrick A. A. F. Dirkx; Piotr J. Meyer, both of Eindhoven, Netherlands

[73] Assignee: U.S. Philips Corporation, New York, N.Y.

[21] Appl. No.: 08/909,916

[22] Filed: Aug. 12, 1997

[30] Foreign Application Priority Data

Sep. 2, 1996 [EP] European Pat. Off. .............. 96202429

[51] Int. Cl.[6] ........................... G05B 11/42; G05B 19/00; H02P 5/40

[52] U.S. Cl. ........................ 318/609; 318/610; 318/561; 318/568.1; 318/573

[58] Field of Search .................................. 318/560–696; 364/474.1–474.36

[56] References Cited

U.S. PATENT DOCUMENTS

| | | | |
|---|---|---|---|
| 4,169,437 | 10/1979 | Fleischer | 123/102 |
| 4,338,672 | 7/1982 | Perzley et al. | 364/513 |
| 4,451,878 | 5/1984 | Shigemasa | 364/151 |
| 4,821,207 | 4/1989 | Ming et al. | 364/513 |
| 5,287,049 | 2/1994 | Olomski et al. | 318/568.1 |
| 5,331,264 | 7/1994 | Cheng et al. | 318/568.11 |
| 5,396,160 | 3/1995 | Chen | 318/573 |
| 5,434,489 | 7/1995 | Cheng et al. | 318/568.15 |
| 5,508,596 | 4/1996 | Olsen | 318/567 |
| 5,638,267 | 6/1997 | Singhose et al. | 364/148 |

*Primary Examiner*—Paul Ip
*Attorney, Agent, or Firm*—Anne E. Barschall

[57] ABSTRACT

The invention relates to a device for displacing an object, which device includes a drive device for moving the object along an axis of motion, a control unit which is coupled to the drive device, a set-point generator which is coupled to the control unit and is arranged to determine from secondary conditions a jerk set profile and set points for a plurality of sampling periods for a trajectory to be traveled and to apply the set points to the control unit per sampling period. A problem solved by the invention consists in that secondary conditions such as, for example the maximum velocity or the desired final position, can be changed during a motion along a trajectory. To this end, during the displacement along the trajectory and in response to a change of the secondary conditions, a jerk set profile and associated set points are derived in the set-point generator from the secondary conditions for the sampling periods as from a sampling period succeeding the change. A jerk set profile is used which comprises two pulse pairs, each pulse pair comprising two pulses of the same amplitude and opposite sign. It is an advantage of the invention that the waiting time for the execution of changed instructions is reduced.

20 Claims, 2 Drawing Sheets

CONTROL BY MEANS OF A SET-POINT GENERATOR

BACKGROUND OF THE INVENTION

1. Field of the Invention

The invention relates to a device for displacing an object, which device includes a drive device for moving the object along an axis of motion, a control unit which is coupled to the drive device, a set-point generator which is coupled to the control unit and is arranged to determine from secondary conditions a jerk set profile and set points for a plurality of sampling periods for a trajectory to be traveled and to apply the set points to the control unit per sampling period.

The invention also relates to a method of displacing an object along a trajectory by means of a drive device, in which a jerk profile and set points are determined from secondary conditions for a plurality of sampling periods for the trajectory.

2. Description of Related Art

A device of the kind set forth is known from U.S. Pat. No. 5,331,264. In the context of the present patent Application, secondary conditions are to be understood to mean initial values, final values and constraints, such as the maximum velocity, the maximum acceleration and the maximum jerk, being the derivative of the acceleration to time. Furthermore, a set profile is to be understood to mean a function of continuous time, representing the value of one of the motion variables at any sampling instant of the task to be performed.

The set-point generator of the known device is arranged to determine, prior to the displacement along the indicated trajectory, the jerk set profile and the other set points for the other motion variables for a plurality of sampling periods for the displacement of the object along the indicated trajectory and to apply the set points to the control unit per sampling period, so that the drive mechanism can displace the object along the indicated trajectory. It is a drawback of the known device that during the displacement of the object along the trajectory there is a waiting period for changing secondary conditions influencing the motion of the object. This waiting period occurs, for example in the case of a correction of the desired final position or upon adjustment of a higher maximum velocity of the object.

SUMMARY OF THE INVENTION

It is an object of the invention to provide a device in which said waiting time is reduced. To achieve this, the device according to the invention is characterized in that the set-point generator is arranged to derive, during a displacement along the trajectory and in response to a change of the secondary conditions, a jerk set profile and associated set points from the secondary conditions for the sampling periods as from a sampling period succeeding the change. As a result of this step, new set points can be derived, substantially without a waiting period, from new secondary conditions associated with a new task, so that the set points of the new task can be applied to the control unit, the old task then being terminated. An example of such a new task is a corrected final position for the object.

A special embodiment of the device according to the invention is characterized in that the set-point generator is arranged to derive the jerk set profile which comprises two pulse pairs, each pulse pair comprising two pulses of the same amplitude and opposite sign. This step offers four different combinations for the different signs of the pulses and seven intervals which must be predetermined, so that use can be made of a mathematical model of seven equations with seven unknowns which can be solved within one or a few sampling periods.

A further device according to the invention is characterized in that the set-point generator is arranged to generate pulses, subject to a constraint. This constraint implies, for example, that the maximum jerk equals zero, that the acceleration equals the maximum acceleration if the jerk equals zero, or that the velocity equals the maximum velocity if the jerk and the acceleration are both zero. As a result of this step, an optimum solution in respect of time is obtained, meaning that the final state is reached in the shortest possible time considering the given secondary conditions.

A further device according to the invention is characterized in that the set-point generator is arranged to derive the sign of the pulses from a state of motion of the object. One effect of this step is that the signs determined are used to a make a choice between various options in the mathematical model in respect of determination of the values of intervals.

A further device according to the invention is characterized in that the set-point generator is arranged to make the period of time between two successive pulses in the jerk set profile equal to zero in dependence on the state of motion of the object and an estimated final position of the object. The effect of this step consists in that the set of equations of the physical model for achieving a time-optimum solution remains solvable.

A further device according to the invention is characterized in that the set-point generator is arranged to determine the set points from the resultant jerk set profile by the sampling of continuously integrated functions. The set points of the acceleration, the velocity and the position can thus be simply and quickly determined within one or a few sampling periods.

A further device according to the invention is characterized in that the set-point generator is arranged to carry out error reduction during the derivation of the set points, which error reduction involves determination of a weighted mean of a value obtained by a forward calculation and a value obtained by a backward calculation of position as well as velocity and acceleration, a function of time being used as the weighting factor. This step enhances the accuracy of the calculations of the set-point generator in respect of calculations of integers having a finite word length or of calculations with operands having a different numerical representation.

A further device according to the invention is characterized in that a position sensor is coupled to the set-point generator. Coupling the output of the position sensor to the set-point generator provides a further feedback of the desired final position and the actual final position of the object.

A further device according to the invention is characterized in that the position sensor includes an electronic camera. It is thus achieved that a position of the object in space is determined in a coordinate system which is independent of the device.

The invention also relates to a set-point generator for use in a device of the kind set forth.

The invention furthermore relates to a method of displacing an object, which method is characterized in that, in response to a change of the secondary conditions during the displacement, a jerk set profile and associated set points are determined from the secondary conditions for the sampling periods as from a sampling period succeeding the change until the end of the trajectory.

BRIEF DESCRIPTION OF THE DRAWINGS

The above and other, more detailed aspects of the invention will be described in detail hereinafter, by way of example, with reference to the drawing.

The drawing consists of the following Figures.

DETAILED DESCRIPTION OF THE REFERRED EMBODIMENT

Figure 1:
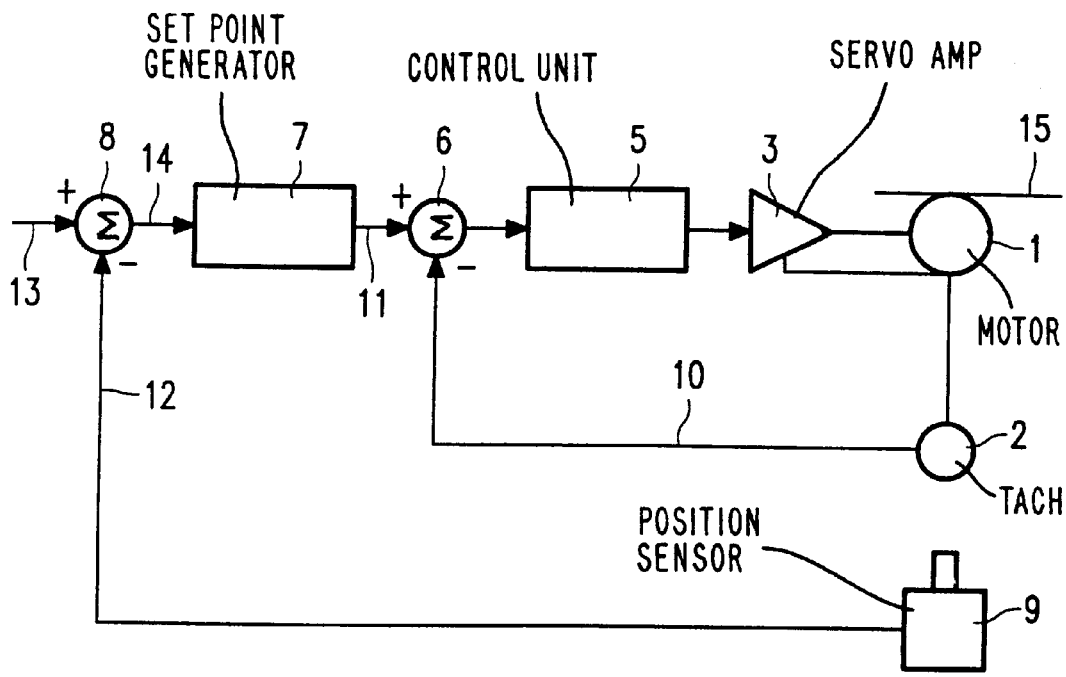
FIG. 1 shows a device for controlling a motor by means of a set-point generator.

FIG. 1 shows an example involving a movable object 15 with a motor control in which the invention can be used. FIG. 1 shows a motor 1 with a servo amplifier 3 which is coupled to a tachometer 2. The tachometer is connected to a control unit 5. The control unit includes a first summing device 6, an input of which is connected to the tachometer whereas another input is connected to a set-point generator 7. The first summing device 6 determines the difference between a feedback signal 10 from the tachometer 2 and a reference signal 11 from the set-point generator 7. The set-point generator is connected to a second summing device 8, one input of which receives a desired position signal 13 and another input of which receives a position signal 12. The set-point generator generates a set point profile and derives the reference signal 11 therefrom. The values of the reference signal are applied to the control unit 5 per sampling period. The sampling frequency has a value in a range of between approximately 5 kHz and 50 kHz. The set- point generator 7 is controlled by a difference signal 14 between the desired position signal 13 and the position signal 12 from a position sensor 9. The position sensor 9 is used to determine the position of the object 15 independently of the drive. To this end, use can be made of, for example an electronic camera which generates the position signal 12. The set-point generator 7 also includes a processing unit (not shown) for executing calculations. An integrated digital signal processing unit of the type Texas Instruments TMS32OC3 1 is an example of such a processing unit.

The invention will be described on the basis of a set-point generator which is arranged for use in a device for performing a point-to-point motion. In the known method disclosed in the cited U.S. Pat. No. 5,331,264, the jerk set profile is generated prior to the displacement along a trajectory, after which the set points are generated for all sampling periods for traveling the trajectory. During the traveling of the trajectory it is no longer possible to change secondary conditions having an effect on the motion of the object. In the set-point generator according to the invention, however, such a change of secondary conditions is possible during the traveling of the trajectory. To this end, the device according to the invention includes a set-point generator which, after the occurrence of a change of the secondary conditions, derives a new jerk set profile from the secondary conditions tor the samples as from a sampling period subsequent to the change. Furthermore, the set-point generator preferably uses a set profile which comprises two pulse pairs, each pulse pair comprising two pulses which, except for the sign, have the same amplitude. One aspect of the invention concerns the determination of the duration and the switching instants of these pulses. The invention will be described further with reference to FIG. 2.

Figure 2:
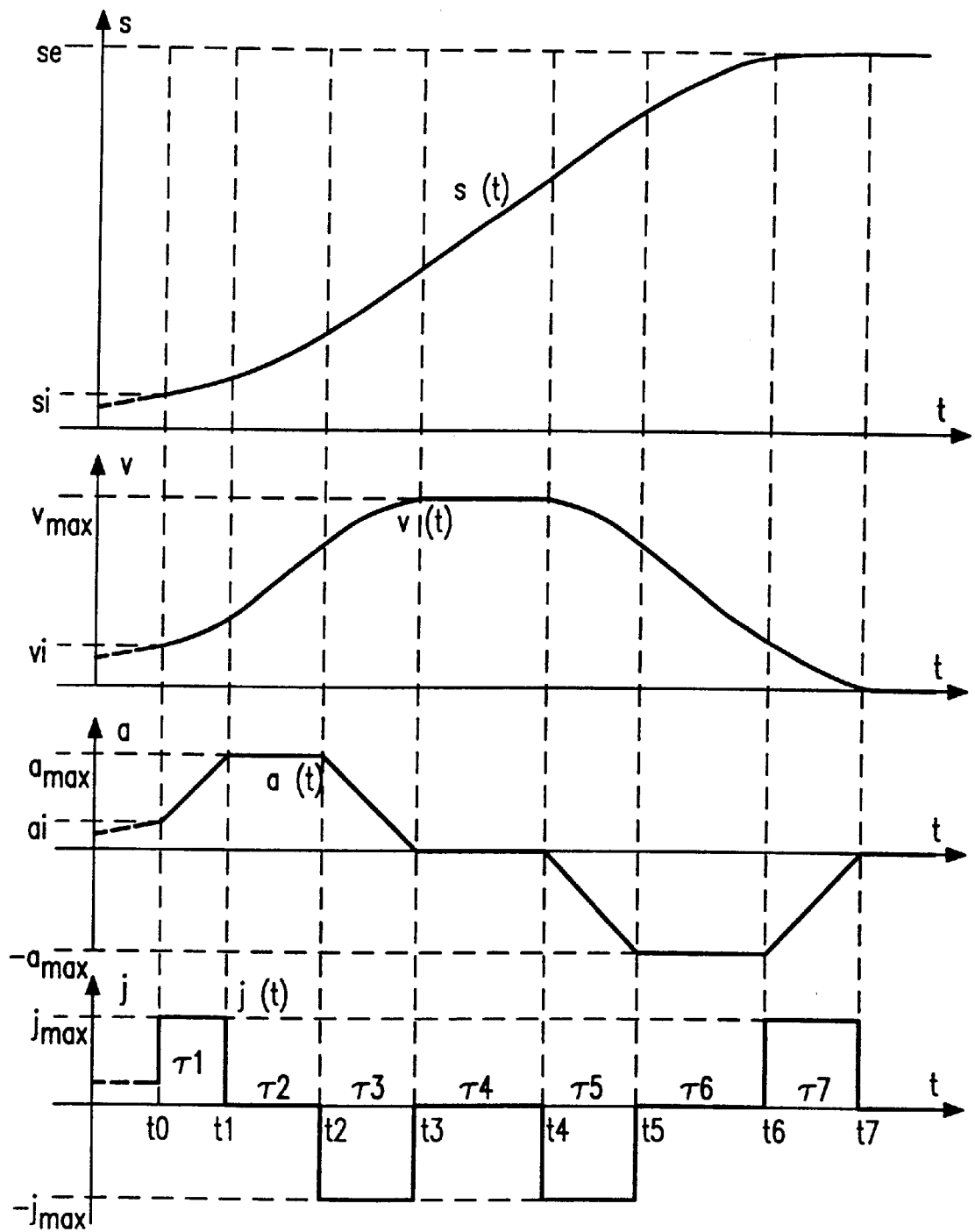
FIG. 2 shows graphs of set profiles for a point-to-point motion.

From the top downwards FIG. 2 shows a position graph, a velocity graph, an acceleration graph and a jerk graph for a point-to-point motion. The dashed line represents a task which possibly has not yet been completed. When such a jerk set profile is assumed, for example the set points associated with such a profile can be determined within a sampling period of from 0.2 to 0.02 s.

One aspect of the invention is the assumption that the point-to-point motion is considered to be a combination of two specific motions: a shock motion and a soft-stop motion. The shock motion is defined as a motion where the final state at an instant $t_e$ is defined by the imposed final velocity $v_e$ and the final acceleration, and the final jerk has the value zero. A soft-stop motion is a special case of a shock motion where the final velocity is zero. The point-to-point motion can thus be subdivided into a maximum of 7 phases of motion:

1. changing of the acceleration to the maximum acceleration,
2. motion at the maximum acceleration,
3. changing of the acceleration to zero,
4. motion at maximum velocity,
5. changing of the acceleration to maximum deceleration,
6. motion at maximum deceleration,
7. changing of the acceleration to zero.

The second, the fourth and the sixth phase of motion may be absent or have, for example a duration zero, because the maximum acceleration, the maximum velocity or the maximum deceleration, respectively, are not reached. Depending on the secondary conditions, the other phases of motion may also have a duration zero. The following conditions are also assumed: at the starting instant $t_0$, the starting position is $s_i$, the initial velocity is $v_i$ and the initial acceleration is $a_i$. During the motion, three constraints must be imposed on the motion variables jerk, acceleration and velocity, i.e. the maximum velocity $v_{max}$, the maximum acceleration $a_{max}$ and the maximum jerk $j_{max}$, the position, velocity and acceleration as a function of time being continuous and at an unknown instant $t_e$ in the final state there is standstill in an imposed position, the final velocity and the final acceleration then having the value 0. Furthermore, the instantaneous position $s_{ptp}(t)$, the instantaneous velocity $v_{ptp}(t)$, the instantaneous acceleration $a_{ptp}(t)$ and the instantaneous jerk $j_{ptp}(t)$ for the point-to-point motion must satisfy the following secondary conditions and constraints of the physical model:

$$s_{ptp}(t_0) = S_i$$
$$s_{ptp}(t_e) = S_e$$
$$v_{ptp}(t_0) = V_i$$
$$v_{ptp}(t_e) = 0$$
$$a_{ptp}(t_0) = a_i$$
$$a_{ptp}(t_e) = 0 \tag{1}$$

$$t_0 \leq \overset{\vee}{t} \leq t_e | v_{ptp}(t) | \leq v_{max} \tag{2}$$

$$t_0 \leq \overset{\vee}{t} \leq t_e | a_{ptp}(t) | \leq a_{max}$$

$$t_0 \leq \overset{\vee}{t} \leq t_e | j_{ptp}(t) | \leq j_{max}$$

Furthermore, if the initial acceleration exceeds the maximum acceleration in this model the maximum acceleration is made equal to the absolute value of the initial acceleration, the velocity set profile being adjusted so that the maximum velocity is maintained for an as long as possible period of time.

Furthermore, in the set-point generator according to the invention one of the constrained variables, such as velocity, acceleration or jerk, is always made equal to the stated positive or negative maximum values during the generating of the set profile. An optimum solution in respect of time is thus obtained. The mathematical model for determining the set profiles of the jerk, acceleration, velocity or position utilizes generalized step functions so that successive integration of the set profile can be simply executed. For a generalized step function of the order n it holds that:

$$\Gamma_n(t-t_0) = \begin{cases} t^n : t \geq t_0 \\ 0 : t < t_0 \end{cases} \quad (3)$$

$$n = 0, 1, 2, \ldots$$

$$\int \Gamma_n(t-t_0)dt = \frac{1}{n+1}\Gamma_{n+1}(t-t_0)$$

A pulse is described by two generalized zero-order step functions of opposite sign and different reference times. The two pairs of pulses of the jerk set profile for the point-to-point motion are described by the switching instants $(t_0,t_1)$, $(t_2,t_3)$, $(t_4,t_5)$ and $(t_6,t_7)$ and an absolute value of the amplitude amounting to the maximum jerk, in which $t_{i-1} \leq t_i$ $\epsilon\{1,\ldots,7\}$. The set profiles of the other motion variables are derived from the jerk set profile by means of successive integrations; $\epsilon_1$ and $\epsilon_2$ indicate the sign of the first and the third jerk pulse. The sign of the second and the fourth pulse opposes that of the first and the third pulse, respectively. The set-point generator determines the switching instants of said seven phases of the jerk set profile by means of integration of the set profile and the system equations. The set profiles are described by the following functions:

$$j_{ptp}(t) = j_{\max}\sum_{k=1}^{2}\epsilon_k[\Gamma_0(t-t_{4k-4}) - \Gamma_0(t-t_{4k-3}) - \Gamma_0(t-t_{4k-2}) + \Gamma_0(t-t_{4k-1})] \quad (4)$$

$$a_{ptp}(t) = j_{\max}\sum_{k=1}^{2}\epsilon_k[\Gamma_1(t-t_{4k-4}) - \Gamma_1(t-t_{4k-3}) - \Gamma_1(t-t_{4k-2}) + \Gamma_1(t-t_{4k-1})] + a_i$$

$$v_{ptp}(t) = \frac{1}{2}j_{\max}\sum_{k=1}^{2}\epsilon_k[\Gamma_2(t-t_{4k-4}) - \Gamma_2(t-t_{4k-3}) - \Gamma_2(t-t_{4k-2}) + \Gamma_2(t-t_{4k-1})] + a_i(t-t_0) + v_i$$

$$s_{ptp}(t) = \frac{1}{6}j_{\max}\sum_{k=1}^{2}\epsilon_k[\Gamma_3(t-t_{4k-4}) - \Gamma_3(t-t_{4k-3}) - \Gamma_3(t-t_{4k-2}) + \Gamma_3(t-t_{4k-1})] + \frac{1}{2}a_i(t-t_0)^2 + v_i(t-t_0) + s_i$$

where $$\epsilon_1,\epsilon_2 \in \{-1,+1\}$$

$$t_{i-1} \leq t_i$$

$$i\in\{1,\ldots,7\}$$

These functions and the inequality describe a third-order problem for three final conditions at $t_7$ for which the following secondary conditions are used:

$$\begin{cases} (1) \; a_{ptp}(t_1) = \epsilon_1 a_{\max} \lor t_1 = t_2 \\ (2) \; a_{ptp}(t_3) = 0 \\ (3) \; a_{ptp}(t_5) = \epsilon_2 a_{\max} \lor t_5 = t_6 \\ (4) \; a_{ptp}(t_7) = 0 \\ (5) \; v_{ptp}(t_3) = -\epsilon_2 v_{\max} \lor t_3 = t_4 \\ (6) \; v_{ptp}(t_7) = 0 \\ (7) \; s_{ptp}(t_7) = s_e \end{cases} \quad (5)$$

where either the first condition or the second condition holds. By substitution of $$t_i = t_{(i-1)} + \tau_i$$

$$i\in\{1,\ldots,7\} \quad (6)$$

the following is obtained by means of (4):

$$\begin{cases} (1) \; a_i + \epsilon_1 j_{\max}\tau_1 = \epsilon a_{\max} \lor \tau_2 = 0 \\ (2) \; a_i + \epsilon_1 j_{\max}(\tau_1 - \tau_3) = 0 \\ (3) \; a_i + \epsilon_1 j_{\max}(\tau_1 - \tau_3) + \epsilon_2 j_{\max}(\tau_5) = \epsilon_2 a_{\max} \lor \tau_6 = 0 \\ (4) \; a_i + \epsilon_1 j_{\max}(\tau_1 - \tau_3) + \epsilon_2 j_{\max}(\tau_5 - \tau_7) = 0 \\ (5) \; \frac{1}{2}\epsilon_1 j_{\max}[(\tau_1+\tau_2+\tau_3)^2 - (\tau_2+\tau_3)^2 - \tau_3^2] + a_i(\tau_1+\tau_2+\tau_3) + v_i = -\epsilon_2 v_{\max} \lor \tau_4 = 0 \\ (6) \; \frac{1}{2}\epsilon_1 j_{\max}\left[\left(\sum_{k=1}^{7}\tau_k\right)^2 - \left(\sum_{k=2}^{7}\tau_k\right)^2 - \left(\sum_{k=3}^{7}\tau_k\right)^2 + \left(\sum_{k=4}^{7}\tau_k\right)^2\right] + \\ \quad \frac{1}{2}\epsilon_2 j_{\max}[(\tau_5+\tau_6+\tau_7)^2 - (\tau_6+\tau_7)^2 - \tau_7^2] + a_i\left(\sum_{k=1}^{7}\tau_k\right) + v_i = 0 \\ (7) \; \frac{1}{6}\epsilon_1 j_{\max}\left[\left(\sum_{k=1}^{7}\tau_k\right)^3 - \left(\sum_{k=2}^{7}\tau_k\right)^3 - \left(\sum_{k=3}^{7}\tau_k\right)^3 + \left(\sum_{k=4}^{7}\tau_k\right)^3\right] + \\ \quad \frac{1}{6}\epsilon_2 j_{\max}[(\tau_5+\tau_6+\tau_7)^3 - (\tau_6+\tau_7)^3 - \tau_7^3] + \\ \quad \frac{1}{2}a_i\left(\sum_{k=1}^{7}\tau_k\right)^2 + v_i\left(\sum_{k=1}^{7}\tau_k\right) + s_i = s_e \end{cases} \quad (7)$$

where $$\epsilon_1,\epsilon_2 \in \{-1,+1\}$$

$$\tau_i \geq 0$$

$$i\in\{1,\ldots,7\}$$

The above mathematical model does not offer an indication as regards the sign $\epsilon_1,\epsilon_2$ of the pulses and how the selection of the alternatives in the equations (7.1), (7.3), (7.5) is performed. According to the invention, first the sign of the pulses is determined and subsequently it is determined which of the alternatives in the equations (7.1), (7.3), (7.5) must be selected. The determination of the sign of $\epsilon_1,\epsilon_2$ for the point-to-point motion utilizes the determination of $\epsilon$ for the shock or soft-stop motion.

During the shock motion an object experiences a maximum acceleration along the axis of motion, the sign of $\epsilon$ being assumed to oppose that of the initial acceleration. The jerk set profile of the shock motion also comprises a pulse pair which comprises two pulses of the same amplitude and opposite sign. The determination ot the sign of $\epsilon$ and the values of $\tau_1,\tau_1\,\tau_3$ is given by $$\begin{cases} (1) \ a_{jog}(t_1) = \epsilon j_{max}(t_1 - t_0) + a_i = \epsilon a_{max} \lor t_2 = 0 \\ (2) \ a_{jog}(t_3) = \epsilon j_{max}[(t_3 - t_0) - (t_3 - t_1) - (t_3 - t_2)] + a_i = 0 \\ (3) \ v_{jog}(t_3) = \frac{1}{2}\epsilon j_{max}[(t_3 - t_0)^2 - (t_3 - t_1)^2 - (t_3 - t_2)^2] + \\ \quad a_i(t_3 - t_0) + v_i = v_e \end{cases} \quad (8)$$

By substitution of $t_i = t_{i-1} + \tau_i$ $\tau_i \geq 0$ $i \in \{1,2,3\}$ (9)

there is obtained $$\begin{cases} (1) \ \epsilon j_{max}\tau_1 + a_i = \epsilon a_{max} \lor \tau_2 = 0 \\ (2) \ \epsilon j_{max}(\tau_1 - \tau_3) + a_i = 0 \\ (3) \ \frac{1}{2}\epsilon j_{max}(\tau_1^2 - \tau_3^2 + 2\tau_1\tau_2 + 2\tau_1\tau_3) + \\ \quad a_i(\tau_1 + \tau_2 + \tau_3) + v_i = 0 \end{cases} \quad (10)$$

This system is solved for $\tau_1, \tau_2$ en $\tau_3$ and it follows that $$\tau_1 = \frac{a_{max}}{j_{max}} - \epsilon\frac{a_i}{j_{max}} \quad (11)$$

$$\tau_2 = \frac{1}{a_{max}}\left[\epsilon(v_e - v_i) + \frac{a_i^2}{2j_{max}}\right] - \frac{a_{max}}{j_{max}}$$

$$\tau_3 = \frac{a_{max}}{j_{max}}$$

if $v_i = \epsilon(v_e - v_i) + \frac{a_i^2}{2j_{max}} \geq \frac{a_{max}^2}{j_{max}}$ (12)

$$\tau_1 = \sqrt{\frac{v_c}{j_{max}}} - \epsilon\frac{a_i}{j_{max}} \quad (13)$$

and $\tau_2 = 0$ $$\tau_3 = \sqrt{\frac{v_c}{j_{max}}}$$

if $v_c \leq \frac{a_{max}^2}{j_{max}}$ (14)

where $\tau_i \geq 0$ $i \in \{1,2,3\}$

In that case, the acceleration is given by $a(t) = a_i - \text{sign}(a_i)j_{max}(t - t_0)$ (15)

After a period of time $\Delta t$, a zero acceleration state is reached. The time interval is given by $$\Delta t = \text{sign}(a_i)\frac{a_i}{j_{max}} = \frac{|a_i|}{j_{max}} \quad (16)$$

The variation of the velocity during the period is called the characteristic velocity variation and is geometrically represented as the surface area below or above the acceleration graph. This characteristic velocity variation is dependent exclusively on the initial state of the object along the axes of motion and the constraints and is further given by $$\Delta v = \text{sign}(a_i)\frac{a_i^2}{2j_{max}} \quad (17)$$

A velocity difference smaller than the characteristic velocity variation means that an initial decrease has occurred in the acceleration, so a negative jerk, followed by an increase of the acceleration to zero, and hence a positive jerk. The sign of $\epsilon$ is then determined by:

$\epsilon = \text{sign}(v_e - v_i - \Delta v)$ (18)

In order to determine the sign of $\epsilon_1, \epsilon_2$ for various physical situations in the point-to-point motion, a stop distance is determined for a given initial state of the object along the axis of motion, a soft-stop motion being assumed instead of the required point-to-point motion. The stop distance can in that case be determined by the formules ( ) given above for the soft-stop motion. Furthermore, the associated sign of $\epsilon$ of the jerk pulse pair can be determined in conformity with the above reasoning. Furthermore, the stop distance and the sign of the associated first jerk pulse $\epsilon_{stop}$ are characteristic quantities which are determined exclusively by the initial state of the object along the axis of motion and the secondary conditions.

The stop distance and the sign $\epsilon_{stop}$ for the position-to-position motion for a number of combinations of the sign of $\epsilon_{stop}$, the state of motion and the resultant estimated final positions and the desired final position are then determined in a manner which is analogous to the manner used to determine the soft-stop motion. The method of determining the sign of $\epsilon_1, \epsilon_2$ for the first and the third jerk pulse for these combinations can be summarized in the following algorithm:

```
if (ε_stop = 1) then
    if (s_f > s_stop) then {ε_1 = 1; ε_2 = -1;}
    else
        if (v_det < -v_max) then {ε_1 = 1; ε_2 = 1;}
        else
            if (a_i > 0)  then
                if (s_f > s_stop1) then  {ε_1 = 1; ε_2 = 1;}
                else                      {ε_1 = -1; ε_2 = 1;}
            else                          {ε_1 = -1; ε_2 = 1;}
else
    if (s_f < s_stop) then {ε_1 = -1; ε_2 = 1;}
    else
        if (v_det > v_max) then {ε_1 = -1; ε_2 = -1;}
        else
            if (a_i < 0)  then
                if (s_f < s_stop) then  {ε_1 = -1; ε_2 = -1;}
                else                     {ε_1 = 1; ε_2 = -1}
            else
{ε_1 = -1; ε_2 = -1;}
``` where $$v_{det} = v_i + \frac{a_i^2}{2j_{max}} \quad (19)$$

$$s_{stop1} = \begin{cases} v_{det}\left(\dfrac{a_{max}}{2j_{max}} + \dfrac{a_i}{j_{max}} - \dfrac{v_{det}}{2a_{max}}\right) - \dfrac{a_i^3}{6j_{max}^2} & \text{for } -v_{det}j_{max} > a_{max}^2 \\ v_{det}\left(\sqrt{-\dfrac{v_{det}}{J_{max}}} + \dfrac{a_i}{j_{max}}\right) - \dfrac{a_i^3}{6j_{max}^2} & \text{for } -v_{det} \le a_{max}^2 \end{cases} \quad (20)$$

$$s_{stop2} = \begin{cases} v_{det}\left(\dfrac{a_{max}}{2j_{max}} - \dfrac{a_i}{j_{max}} + \dfrac{v_{det}}{2a_{max}}\right) - \dfrac{a_i^3}{6j_{max}^2} & \text{for } -v_{det}j_{max} > a_{max}^2 \\ v_{det}\left(\sqrt{-\dfrac{v_{det}}{J_{max}}} - \dfrac{a_i}{j_{max}}\right) - \dfrac{a_i^3}{6j_{max}^2} & \text{for } -v_{det} \le a_{max}^2 \end{cases} \quad (21)$$

$$s_{stop} = \begin{cases} v_i'\left[\dfrac{a_{max}}{2j_{max}} - \epsilon\left(\dfrac{a_i}{j_{max}} + \dfrac{v_i'}{2a_{max}}\right)\right] - \dfrac{a_i^3}{6j_{max}^2} & \text{for } v_c = \\ \epsilon_{stop}(v_e - v_i) \ge \dfrac{a_{max}^2}{j_{max}} \\ v_i'\left(\sqrt{\dfrac{v_c}{j_{max}}} - \epsilon\dfrac{a_i}{j_{max}}\right) - \dfrac{a_i^3}{6j_{max}^2} & \text{for } v_c = \epsilon_{stop} < \dfrac{a_{max}^2}{j_{max}} \end{cases} \quad (22)$$

and $s_f$ represents the desired final position.

The mathematical system (7) can be solved for the quantities $\epsilon$ determined for the first and the third jerk pulse. In this respect it is assumed that the point-to-point motion can be considered to be a shock motion up to a final velocity equal to $-\epsilon_2 v_{max}$, followed by a soft-stop motion, so that for the calculation of the intervals $\tau_1, \tau_2, \tau_3$ of the initial states and $\tau_5, \tau_6$ and $\tau_7$ in the final states use can be made of the formulas of the shock-motion and the soft-stop motion, respectively. $\tau_4$ is subsequently determined from the equation 7.7 by utilizing the values found for $\tau_1, \tau_2, \tau_3$ and $\tau_3, \tau_6, \tau_7$. The set of equations (7) can be solved if the value determined for $\tau_4$ is not negative. It the value determined for τ4 is negative, the assumption that the maximum velocity has been reached is false and in the equation (7.5) the alternative $\tau_4 = 0$ must be chosen.

Subsequently, it is determined which alternatives must be selected in the equations (7.1) and (7.3). To this end, use is made of the state of motion of the object and the desired final state. Furthermore, the case $\tau_4=0$ and $\epsilon_1=\epsilon_2$ and the case $\tau_4=0$ and $\epsilon_1 \ne \epsilon_2$ are distinguished. In the first case, applicable to $\tau_4=0$ and $\epsilon_1=\epsilon_2$, the time optimization problem is not suitably defined. In the second case an optimum solution in respect of time, however, is possible. For the first case it also holds that the initial velocity $v_i''$ is so high that the new maximum velocity cannot be reached without exceeding the desired final position, the absolute value of the new maximum velocity being smaller than the initial velocity $v_i'$. In this case use is made a non-optimum soft-stop motion which is determined such that the desired final position is reached. Because in all calculations in the set-point generator according to the invention first the signs of $\epsilon_1, \epsilon_2$ are determined, the intervals must be selected so that the desired result is obtained with the assumed signs of $\epsilon_1, \epsilon_2$. Two situations can thus occur: a standard soft-stop motion and a non-standard soft-stop motion. In the standard soft-stop motion the intervals $\tau_1, \tau_2$ and $\tau_3$ are determined and the other intervals are set to zero.

In the non-standard soft-stop motion, occurring if the initial acceleration is higher than the absolute value of the maximum acceleration, only the intervals $\tau_3, \tau_6$ and $\tau_7$ are determined and the other intervals are also set to zero. Moreover, the acceleration is chosen so that the final position is reached exactly and the acceleration is less than the stated maximum acceleration. The intervals $\tau_1, \tau_2, \tau_3$ can then be determined by means of the soft-stop model, utilizing a unidirectional pulse pair. In order to obtain a clear set of equations, the following new parameters are substituted in the soft-stop model:

$$\epsilon = \epsilon_1 = \epsilon_2 \quad (23)$$

$$v_i'' = v_i + \epsilon \dfrac{a_i^2}{2j_{max}}$$

$$s_f'' = s_f - \epsilon \dfrac{v_i'' a_i}{j_{max}} + \dfrac{a_i^3}{6j_{max}^2}$$

$$\tau_3'' = \epsilon_1 \dfrac{a_i}{j_{max}} - \tau_3$$

The set of equations describing a non-standard soft-stop model comprises three equations for the velocity, for the distance and for ensuring the presence of a constant acceleration interval, respectively:

$$\begin{cases} s_f'' = v_i'' \dfrac{\tau_6 - \tau_7}{2} \\ v_i'' = -\epsilon j_{max} \tau_6 \tau_7 \\ \tau_3'' = \tau_7 \end{cases} \quad (24)$$

This system can be reduced to a single quadratic equation providing the solution. The solutions are then the sole solutions of real non-negative intervals for the given secondary and final conditions when the normal soft-stop motion is used in the case that $$\epsilon a_1 < 0 \lor \text{sign}(a_i) = \text{sign}\left(s_f + \dfrac{a_i^3}{24 j_{max}^2}\right)$$

and the non-standard soft-stop motion is used in the other cases.

For the case $\tau_4=0$ en $\epsilon_1=\epsilon_2$, utilizing opposed pulse pairs without a constant velocity interval, an optimum solution in respect of time is possible, however. In that case it is determined whether $\tau_2$ or $\tau_6$ must be equal to 0. To this end, use is made of a method which includes forward reasoning and backward reasoning. According to the forward reasoning it is assumed that $\tau_2=0$, the maximum acceleration with the correct sign being reached at the instant $t_i=t_2$. Subsequently, it is attempted to falsify this assumption. To this end, the three intervals and the velocity at the instant $t_3=t_4$ are expressed as $$\tau_1' = \tau_3 = \dfrac{a_{max}}{j_{max}}$$

$$v_3 = v_{ptp}(t_3) = v_i' + \epsilon_1 \dfrac{a_{max}^2}{j_{max}}$$

where $$t_1 = t_1' - \epsilon_1 \dfrac{a_i}{j_{max}} \quad \text{and} \quad \tau_2 = 0.$$

Furthermore, it must be possible to execute a soft-stop motion as from the velocity $v_3$ and a zero acceleration with a stop- $\epsilon$ equal to $\epsilon_2$. This is possible only if the sign of $v_3$ opposes that of $\epsilon_2$. If the latter is not the case, the original assumption is false and $\tau_2$ must be unequal to 0, so $\epsilon_2 v_3 > 0 \Rightarrow \tau_2 > 0$. If the soft-stop motion is possible, the distance traveled (referred to as the forward distance) is determined by way of the sum of the shock distance and the stop distance:

$$s_{fwd} = v'_i \tau_1 + v_3\left(\tau_3 + \tau_5 + \frac{\tau_6}{2}\right) - \frac{a_i^3}{6 j_{max}^2} \quad (25)$$

Comparison of the forward distance $s_{fwd}$ and the desired distance $s_f$ and the sign of $\epsilon_1$ yields conclusions as regards the value of $\tau_2$; if the difference between $s_f$ and $s_{fwd}$ has the sign of $\epsilon_1$, a value of $\tau_2$ which is not equal to zero is required; if the sign of the difference is not the same as that of $\epsilon_1$, $\tau_2$ must be set equal to 0, so $$\epsilon_1(s_f - s_{fwd}) > 0 \Rightarrow \tau_2 > 0 \quad (26)$$
$$\epsilon_1(s_f - s_{fwd}) < 0 \Rightarrow \tau_2 = 0$$

For the backward reasoning it is assumed that $\tau_6=0$, the maximum acceleration then being reached with the correct sign at the instant $t_5=t_6$. Subsequently, it is attempted to falsify this assumption. To this end, the three intervals and the velocity at the instant $t_3=t_4$ are expressed as $$\tau_5 = \tau_7 = \frac{a_{max}}{j_{max}} \text{ and } \tau_6 = 0$$
$$v_3 = v_{ptp}(t_3) = -\epsilon_2 \frac{a_{max}^2}{j_{max}}.$$

Furthermore, it must be possible to perform a shock motion as from the initial state until the velocity $v_3$ is reached with a shock $\epsilon$ equal to $\epsilon_1$. This is possible only if the sign of $v_3-v_i'$ opposes that of $\epsilon_1$. If the latter is not the case, the original assumption is false and $\tau_6$ must be unequal to 0, so $\epsilon_1(v_3-v_i')<0 \Rightarrow \tau_6>0$. If the shock motion is possible, the distance traveled (referred to as the backward distance) is determined by way of the sum of the shock distance and the stop distance:

$$s_{bwd} = v'_i\left(\tau_1 + \frac{\tau_2}{2}\right) + v_3\left(\frac{\tau_2}{2} + \tau_3 + \frac{\tau_5}{2}\right) - \frac{a_i^3}{6 j_{max}^2} \quad (27)$$

Comparison of the backward distance $s_{bwd}$, the desired distance $s_f$ and the sign of $\epsilon_1$ offers conclusions in respect of the value of $\tau_6$ $$\epsilon_2(s_f - s_{bwd}) > 0 \Rightarrow \tau_6 > 0 \quad (28)$$
$$\epsilon_2(s_f - s_{bwd}) \leq 0 \Rightarrow \tau_6 = 0$$

The alternative to be chosen in the equations (7.1) and (7.3) follows from the equation (26) and the sign of $\epsilon_2 v_3$, and from the equation (28) and the sign of $\epsilon_1(v_3-v_i')$, respectively.

For all cases, except $\tau_4=0, \epsilon_1=\epsilon_2$, seven equations can then be selected from the set of equations (7), so that $\tau_1 \ldots \tau_7$ are determined. The case $\tau_4=0$, $\epsilon_1=\epsilon_2$ has been described separately. The value of the intervals $\tau_1 \ldots \tau_7$ and the signs $\epsilon_1, \epsilon_2$ are subsequently substituted in the set profiles as defined in the mathematical model (4). Subsequently, the set-point generator calculates the set points for each sampling period by the sampling of continuously integrated functions. This offers the advantage that it can be performed more simply in comparison with a discrete numerical integration.

Furthermore, the processing unit utilizes numbers with a floating decimal point notation with single precision or integers with a word length of, for example 32 bits. Inaccuracies may then occur, for example in the calculation of the distance in integers with a word length of 32 bits from velocities, accelerations, jerk and time represented as floating decimal point numbers with single precision.

In order to enhance the accuracy of the calculations in the digital processing unit of the set-point generator, use is preferably made of error reduction. The error reduction utilizes the time variable in two ways. According to the first way the length of the interval in which the sampling commences is reduced by one sampling period after the calculation of each sample. The intervals having passed are set to zero. Thus, motions can be performed within a sampling period, the new set points also being obtained in relation to the set points of the previous sampling period. By reducing the interval it is assumed that the previously calculated set points serve as initial data for the calculation of the next sampling and the previous sampling instant serves as the initial sampling instant.

According to the other method, the set position and possibly other set data are based on the theoretical breakpoint values for the points between the intervals. A breakpoint is to be understood to mean herein a discontinuity in the jerk. These breakpoints need not necessarily coincide with the sampling instants. The breakpoint values are related to the theoretical set data of these points. Furthermore, in calculations based on said intervals and reference points the error is substantially zero in the reference points and increases as the interval increases. Furthermore, the breakpoint values, notably those for the position, are not accurate. Thus, errors calculated exclusively by means of the initial conditions increase in the course of execution of the task to be performed, so that position errors increase in time and the final position does not correspond to the desired final position. In order to counteract said errors, in the set-point generator according to the invention the necessary breakpoints are determined on the basis of actual intervals in each sampling period. Thus, all breakpoints are determined in the actual position. Furthermore, a forward calculation and a backward calculation are used. During a forward calculation, the breakpoints refer to the initial conditions in the initial state and the set points refer to the breakpoints passed. In a backward calculation, in the final state set points refer to the final state and the set points refer to the breakpoints situated ahead in time. Said errors occur in the central zone during the execution of the task. In order to counteract said errors, a weighted mean of a value calculated according to the forward calculation and of a value calculated according to the backward calculation is used for position, velocity as well as acceleration, a function of time being the weighting factor. The weighted mean values for the motion variables are given by the formule:

$$a(t) = \frac{t}{t_{tot}} a_{back}(t) + \frac{t_{tot}-t}{t_{tot}} a_{forw}(t) \quad (29, 30, 31)$$
$$v(t) = \frac{t}{t_{tot}} v_{back}(t) + \frac{t_{tot}-t}{v_{forw}} v_{forw}(t)$$
$$s(t) = \frac{t}{t_{tot}} s_{back}(t) + \frac{t_{tot}-t}{t_{tot}} s_{forw}(t)$$

Figure 3:
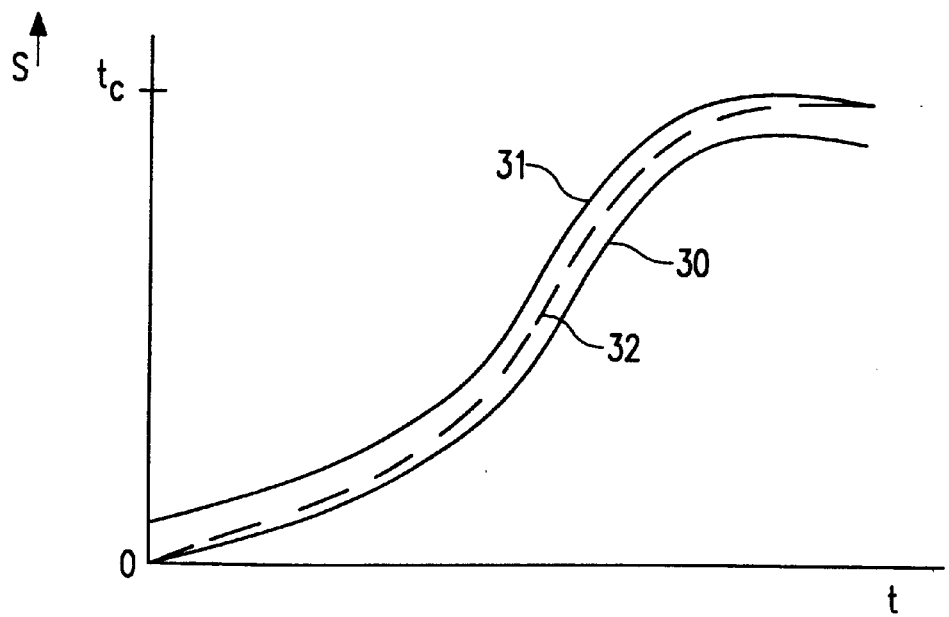
FIG. 3 shows an example of a corrected set profile.

Thus, the set profile will be nearer to the forward set profile at the beginning and nearer to the backward set profile at the end, without a discontinuity occurring in the set profile. FIG. 3 shows an example of a weighted mean value of the position according to the forward and the backward calculation.

The first curve 30 shows a position according to the forward calculation; the second curve 31 shows a position according to the backward calculation, and the third curve 32 shows the result of a weighted mean value according to the equations (31).

Index of symbols a(t) acceleration as function of continuous time
$a_i$ initial acceleration
$a_{max}$ maximum acceleration imposed by the user
back indication for backward calculation
$\Delta s_0,,\Delta s_3$ distance from the start to a breakpoint
$\epsilon$ number of the set $\{-1,1\}$
$\epsilon_1,\epsilon_2$ ditto, but for the point-to-point motion
$\Gamma(t-t_0)$ generalized step function of order n with increasing moment $t_0$
forw indication for forward calculation
j(t) jerk, derivative of the acceleration according to time as a function of continuous time
$j_{max}$ maximum jerk imposed by the user
JOG indication used for shock motion in generalized functions
PTP indication for point-to-point motion
s(t) absolute position as a function of continuous time
$s_f$ total displacement in a point-to-point motion
$s_t$ apparent displacement (PTP), corrected for an initial acceleration unequal to zero
STP indication for soft-stop motion
t continuous time, argument in set profiles
$t_0,,t_i$ starting instant of a task
$t_1,,t_7$ breakpoint instants
$t_e$ final instant of a task
$t_{tot}$ total duration of a task
$\tau_1,,\tau_7$ duration of time segments between jerk discontinuities
$\tau_1$ first interval corrected for an initial acceleration unequal to zero.
v(t) velocity as a function of continuous time
$v_1,,v_7$ velocity at a given breakpoint
$v_e$ final velocity for a shock motion
$v_i$ initial velocity for all motions
$v_{max}$ maximum velocity imposed by the user for a point-to-point motion

We claim:

1. A device for displacing an object, comprising:
   a drive device being capable of moving the object;
   a control unit coupled to said drive device;
   a set-point generator coupled to said control unit, said set-point generator capable of determining, from secondary conditions, a jerk set profile and set points for a plurality of sampling periods for a trajectory to be travelled by the object and applying the set points to said control unit per sampling period;
   wherein, during a displacement along the trajectory of the object, and in response to a change of the secondary conditions, said set-point generator being capable of determining the jerk set profile and associated set points based upon the changed secondary conditions.

2. A device as claimed in claim 1, wherein the jerk set profile comprises two pulse pairs, each pulse pair comprising two pulses of the same amplitude and opposite sign.

3. A device as claimed in claim 2, wherein said set-point generator is capable of generating pulses, subject to a constraint.

4. A device as claimed in claim 3, wherein said set-point generator is capable of deriving the sign of the pulses from a state of motion of the object.

5. A device as claimed in claim 4, wherein said set-point generator is capable of making a period of time between two successive pulses in the jerk set profile equal to zero in dependence on a state of motion of the object and an estimated final position of the object.

6. A device as claimed in claim 2, wherein said set-point generator is capable of making a period of time between two successive pulses in the jerk set profile equal to zero in dependence on a state of motion of the object and an estimated final position of the object.

7. A device as claimed in claim 6, wherein said set-point generator is capable of determining the set points from a resultant jerk set profile by sampling of continuously integrated functions.

8. A device as claimed in claim 7, wherein said set-point generator is capable of carrying out error reduction during a derivation of the set points, the error reduction includes determination of a weighted mean of a value obtained by a forward calculation and a value obtained by a backward calculation of position as well as velocity and acceleration, a function of time being used as the weighting factor.

9. A device as claimed in claim 8, further comprising a position sensor coupled to said set-point generator.

10. A device as claimed in claim 3, wherein said set-point generator is capable of making a period of time between two successive pulses in the jerk set profile equal to zero in dependence on a state of motion of the object and an estimated final position of the object.

11. A device as claimed in claim 3, wherein said set-point generator is capable of carrying out error reduction during a derivation of the set points, the error reduction includes determination of a weighted mean of a value obtained by a forward calculation and a value obtained by a backward calculation of position as well as velocity and acceleration, a function of time being used as the weighting factor.

12. A device as claimed in claim 1, wherein said set-point generator is capable of making a period of time between two successive pulses in the jerk set profile equal to zero in dependence on a state of motion of the object and an estimated final position of the object.

13. A device as claimed in claim 5, wherein said set-point generator is capable of determining the set points from a resultant jerk set profile by sampling of continuously integrated functions.

14. A device as claimed in claim 5, wherein said set-point generator is capable of carrying out error reduction during a derivation of the set points, the error reduction includes determination of a weighted mean of a value obtained by a forward calculation and a value obtained by a backward calculation of position as well as velocity and acceleration, a function of time being used as the weighting factor.

15. A device as claimed in claim 12, further comprising a position sensor coupled to said set-point generator.

16. A device as claimed in claim 1, wherein said set-point generator is capable of determining the set points from a resultant jerk set profile by sampling of continuously integrated functions.

17. A device as claimed in claim 1, wherein said set-point generator is capable of carrying out error reduction during a derivation of the set points, the error reduction includes determination of a weighted mean of a value obtained by a forward calculation and a value obtained by a backward calculation of position as well as velocity and acceleration, a function of time being used as the weighting factor.

18. A device as claimed in claim 1, further comprising a position sensor coupled to said set-point generator.

19. A device as claimed in claim 18, wherein said position sensor includes an electronic camera.

20. A method of displacing an object along a trajectory, said method comprising the steps of:

displacing the object along the trajectory using a drive device;

controlling the displacement of the object using a jerk set profile and set points for a plurality of sampling periods for the trajectory, the jerk set profile and set points being based upon secondary conditions;

detecting a change of the secondary conditions during the displacement;

determining a new jerk set profile and associated set points based upon the changed secondary conditions.

* * * * *